United States Patent
Tzannes

(10) Patent No.: US 11,394,485 B2
(45) Date of Patent: Jul. 19, 2022

(54) DMT SYMBOL REPETITION IN THE PRESENCE OF IMPULSE NOISE

(71) Applicant: TQ DELTA, LLC, Austin, TX (US)

(72) Inventor: Marcos C. Tzannes, Petaluma, CA (US)

(73) Assignee: TQ DELTA, LLC, Austin, TX (US)

( * ) Notice: Subject to any disclaimer, the term of this patent is extended or adjusted under 35 U.S.C. 154(b) by 0 days.

(21) Appl. No.: 16/569,144

(22) Filed: Sep. 12, 2019

(65) Prior Publication Data

US 2020/0007268 A1    Jan. 2, 2020

Related U.S. Application Data

(63) Continuation of application No. 15/479,866, filed on Apr. 5, 2017, now abandoned, which is a continuation (Continued)

(51) Int. Cl.
*H04L 1/00*   (2006.01)
*H04L 27/26*  (2006.01)
(Continued)

(52) U.S. Cl.
CPC .......... *H04L 1/0011* (2013.01); *H04B 1/0475* (2013.01); *H04B 3/50* (2013.01);
(Continued)

(58) Field of Classification Search
CPC ....... H04L 2025/03414; H04L 27/2601; H04L 5/143; H04L 1/0041; H04L 1/0045; H04L 27/2626; H04L 12/2898; H04L 2012/2841; H04L 2012/6478; H04L 27/12; H04L 27/38; H04L 47/14; H04L 25/03343;
(Continued)

(56) References Cited

U.S. PATENT DOCUMENTS 4,979,174 A   12/1990  Cheng et al.
5,214,501 A    5/1993  Cavallerano et al.
(Continued)

FOREIGN PATENT DOCUMENTS

CA    2881036 C       12/2015
DE    10225663 A1  *  1/2004   ......... H04L 25/0204
(Continued)

OTHER PUBLICATIONS

U.S. Appl. No. 60/078,549, filed Mar. 19, 1998, Jascobsen.
(Continued)

*Primary Examiner* — Linda Wong
(74) *Attorney, Agent, or Firm* — Jason H. Vick; Sheridan Ross, PC

(57) ABSTRACT

With the current initialization procedures defined in the VDSL and ADSL standards, even though the xDSL system could operate in Showtime in an impulse noise environment where symbols are being corrupted, the transceivers would not be able to reach Showtime because initialization would fail due to initialization message failure. Through the use of an improved initialization procedure for communication systems, operation in environments with higher levels of impulse noise is possible.

22 Claims, 6 Drawing Sheets

Related U.S. Application Data of application No. 14/559,156, filed on Dec. 3, 2014, now Pat. No. 9,621,198, which is a continuation of application No. 12/769,747, filed on Apr. 29, 2010, now Pat. No. 8,913,649, which is a continuation of application No. 11/575,598, filed as application No. PCT/US2005/036815 on Oct. 14, 2005, now Pat. No. 7,796,705.

(60) Provisional application No. 60/619,618, filed on Oct. 15, 2004.

(51) Int. Cl.
  H04B 1/04 (2006.01)
  H04B 3/50 (2006.01)
  H04L 1/20 (2006.01)
  H04M 11/06 (2006.01)
  H04L 1/08 (2006.01)

(52) U.S. Cl.
  CPC ............ H04L 1/007 (2013.01); H04L 1/0009 (2013.01); H04L 1/0041 (2013.01); H04L 1/0045 (2013.01); H04L 1/0061 (2013.01); H04L 1/0071 (2013.01); H04L 1/08 (2013.01); H04L 1/20 (2013.01); H04L 27/2602 (2013.01); H04M 11/062 (2013.01); H04L 1/0026 (2013.01)

(58) Field of Classification Search
  CPC ... H04L 5/023; H04L 27/2647; H04L 27/362; H04L 5/06; H04L 27/0014; H04L 27/0008; H04L 27/265; H04L 1/004; H04L 27/2628; H04L 5/0007; H04L 1/0057; H04L 27/2607; H04L 1/0006; H04L 1/0054; H04L 1/02; H04L 1/0625; H04L 27/2634; H04L 5/0005; H04L 5/0016; H04L 5/0046; H04L 2025/03445; H04L 25/03159; H04L 1/0011; H04L 1/0009; H04L 1/0061; H04L 1/007; H04L 1/0071; H04L 1/08; H04L 1/20; H04L 27/2602; H04L 1/0026; H04L 1/00; H04M 11/00; H04M 3/30; H04M 3/304; H04M 11/062; H04M 7/006; H04M 9/027; H04W 72/0413; H04W 72/042; H04W 72/0426; H04H 20/33; H04N 7/17309; H04N 7/10; H04N 21/4382; H04N 21/6118; H04N 21/43615; H04N 21/43632; H04N 21/6137; H04N 21/6168; H04B 1/707; H04B 7/2668; H04B 1/71637; H04B 3/542; H04B 1/0475; H04B 3/50; H04B 15/00; H04J 14/0298; Y02B 60/35; Y02B 60/36; Y02B 60/50
  See application file for complete search history.

(56) References Cited

U.S. PATENT DOCUMENTS

| | | | |
|---|---|---|---|
| 5,287,384 A | 2/1994 | Avery et al. | |
| 5,351,016 A | 9/1994 | Dent | |
| 5,420,640 A | 5/1995 | Munich et al. | |
| 5,422,913 A | 6/1995 | Wilkinson | |
| 5,521,943 A | 5/1996 | Dambacher | |
| 5,596,604 A | 1/1997 | Cioffi et al. | |
| 5,635,864 A | 6/1997 | Jones | |
| 5,675,585 A | 10/1997 | Bonnot et al. | |
| 5,745,275 A | 4/1998 | Giles et al. | |
| 5,751,338 A | 5/1998 | Ludwig, Jr. | |
| 5,764,649 A | 6/1998 | Tong | |
| 5,793,759 A | 8/1998 | Rakib et al. | |
| 5,818,826 A * | 10/1998 | Gfeller | H04L 1/08 370/465 |
| 5,835,527 A | 11/1998 | Lomp | |
| 5,903,612 A | 5/1999 | Van Der Putten et al. | |
| 5,905,874 A | 5/1999 | Johnson | |
| 5,917,340 A | 6/1999 | Manohar et al. | |
| 5,995,539 A | 11/1999 | Miller | |
| 6,041,057 A | 3/2000 | Stone | |
| 6,081,291 A | 6/2000 | Ludwig, Jr. | |
| 6,137,839 A | 10/2000 | Mannering et al. | |
| 6,226,322 B1 | 5/2001 | Mukherjee | |
| 6,243,414 B1 | 6/2001 | Drucker et al. | |
| 6,249,543 B1 | 6/2001 | Chow | |
| 6,408,033 B1 | 6/2002 | Chow et al. | |
| 6,421,323 B1 | 7/2002 | Nelson et al. | |
| 6,449,288 B1 | 9/2002 | Chari et al. | |
| 6,452,958 B1 | 9/2002 | van Nee | |
| 6,473,418 B1 | 10/2002 | Laroia et al. | |
| 6,578,162 B1 | 6/2003 | Yung | |
| 6,580,761 B2 * | 6/2003 | Laroia | H04L 27/2614 375/240 |
| 6,628,722 B1 | 9/2003 | Laroia et al. | |
| 6,639,935 B2 | 10/2003 | Gibbons et al. | |
| 6,640,239 B1 | 10/2003 | Gidwani | |
| 6,657,949 B1 | 12/2003 | Jones, IV et al. | |
| 6,735,221 B1 | 5/2004 | Cherubini | |
| 6,754,290 B1 | 6/2004 | Halter | |
| 6,904,537 B1 | 6/2005 | Gorman | |
| 6,925,112 B1 | 8/2005 | Morejon et al. | |
| 7,024,592 B1 | 4/2006 | Voas et al. | |
| 7,028,246 B2 | 4/2006 | Kim et al. | |
| 7,072,419 B2 | 7/2006 | Kim | |
| 7,079,567 B2 | 7/2006 | van Nee | |
| 7,221,680 B2 | 3/2007 | Vijayan et al. | |
| 7,200,138 B2 | 4/2007 | Liu | |
| 7,203,206 B2 | 4/2007 | Amidan et al. | |
| 7,221,650 B1 | 5/2007 | Cooper et al. | |
| 7,236,452 B2 | 6/2007 | Maeda et al. | |
| 7,257,166 B2 | 8/2007 | Kim | |
| 7,263,130 B1 * | 8/2007 | Mitlin | H04K 1/10 370/208 |
| 7,349,460 B2 | 3/2008 | Choi et al. | |
| 7,400,688 B2 | 7/2008 | Garrett | |
| 7,428,669 B2 * | 9/2008 | Cioffi | H04L 41/0853 714/704 |
| 7,499,488 B2 | 3/2009 | Yousef et al. | |
| 7,600,178 B2 | 10/2009 | Deczky | |
| 7,630,448 B2 | 12/2009 | Zhidkov | |
| 7,630,489 B2 * | 12/2009 | Oksman | H04L 1/0071 379/392.01 |
| 7,796,705 B2 | 9/2010 | Tzannes | |
| 8,913,649 B2 | 12/2014 | Tzannes | |
| 9,621,198 B2 | 4/2017 | Tzannes | |
| 2001/0036233 A1 * | 11/2001 | Laroia | H04L 1/08 375/286 |
| 2002/0015401 A1 | 2/2002 | Subramanian et al. | |
| 2002/0172184 A1 | 11/2002 | Kim et al. | |
| 2003/0043925 A1 | 3/2003 | Stopler et al. | |
| 2003/0131209 A1 | 7/2003 | Lee | |
| 2003/0148780 A1 | 8/2003 | Takano | |
| 2003/0161412 A1 | 8/2003 | Niida et al. | |
| 2004/0022270 A1 | 2/2004 | Noma et al. | |
| 2004/0022305 A1 | 2/2004 | Tzannes | |
| 2004/0027994 A1 | 2/2004 | Baines | |
| 2004/0081227 A1 | 4/2004 | Lim et al. | |
| 2004/0082356 A1 | 4/2004 | Walton et al. | |
| 2004/0120435 A1 | 6/2004 | Yang et al. | |
| 2004/0125866 A1 | 7/2004 | Gryska et al. | |
| 2004/0156386 A1 | 8/2004 | Atarashi et al. | |
| 2004/0247060 A1 | 12/2004 | Shibuya et al. | |
| 2005/0079889 A1 | 4/2005 | Vaglica et al. | |
| 2005/0213676 A1 | 9/2005 | Stopler et al. | |
| 2005/0276337 A1 | 12/2005 | Khan | |
| 2005/0276340 A1 | 12/2005 | Chow et al. | |
| 2006/0056305 A1 | 3/2006 | Oksman et al. | |
| 2006/0078044 A1 | 4/2006 | Norrell et al. | |
| 2007/0053449 A1 | 3/2007 | Adachi | |
| 2008/0008256 A1 | 1/2008 | Matsumoto et al. | |

(56) References Cited

U.S. PATENT DOCUMENTS

| | | |
|---|---|---|
| 2008/0062872 A1 | 3/2008 | Christiaens et al. |
| 2008/0069248 A1 | 3/2008 | Heise et al. |
| 2008/0304587 A1 | 12/2008 | Setoh et al. |
| 2011/0116573 A1 | 5/2011 | Heise et al. |
| 2017/0214487 A1 | 7/2017 | Tzannes |

FOREIGN PATENT DOCUMENTS

| | | | |
|---|---|---|---|
| EP | 0966135 | 12/1999 | |
| EP | 0996135 | 4/2000 | |
| EP | 1043874 A2 | 10/2000 | |
| EP | 1414176 | 4/2004 | |
| EP | 1416629 A2 | 5/2004 | |
| EP | 1437871 A1 | 7/2004 | |
| EP | 1309095 B1 | 11/2006 | |
| JP | 61-270934 | 12/1986 | |
| JP | 05-207075 | 8/1993 | |
| JP | 08-195709 | 7/1996 | |
| JP | 2000-068976 | 3/2000 | |
| JP | 2003-505971 | 2/2003 | |
| JP | 2003-234696 | 8/2003 | |
| JP | 2004-166261 | 6/2004 | |
| JP | 3940203 B2 * | 7/2007 | .............. H04L 1/08 |
| WO | WO 98/47238 | 10/1998 | |
| WO | WO 00/41395 | 7/2000 | |
| WO | WO 00/54473 | 9/2000 | |
| WO | WO 01/08316 | 2/2001 | |
| WO | WO 01/11833 | 2/2001 | |
| WO | WO 2004/070992 | 8/2004 | |

OTHER PUBLICATIONS

Bauer, Rainer et al. "Iterative Source/Channel-Decoding Using Reversible Variable Length Codes" Munich University of Technology, 2000 (10 pages).
Business Wire "New FatPipe T1 Speed Product Produces Speeds up to 4.5Mbps and Redundancy for a Fraction of the Cost of a Fractional T3!" Business Wire, Oct. 16, 1998 (2 pages).
Cisco Systems, Inc. "Alternatives for High Bandwidth Connections Using Parallel T1/E1 Links" 1998 (8 pages).
Dai, Huaiyu "Crosstalk Mitigation in DMT VDSL with Impulse Noise" IEEE Transactions on Circuits and Systems—1: Fundamental Theory and Applications, vol. 48, No. 10, Oct. 2001 (9 pages).
Goodman, David et al. "Maximizing the Throughput to CDMA Data Communications" Polytechnic University, Brooklyn, NY, Oct. 2003 (5 pages).
ITU-T, G.992.3, Series G: Transmission Systems and Media, Digital Systems and Networks, Asymmetric Digital Subscriber Line Transceivers 2 (ADSL2) Jul. 2002 (312 pages).
ITU-T, G.992.3, Series G: Transmission Systems and Media, Digital Systems and Networks, Asymmetric Digital Subscriber Line Transceivers 2 (ADSL2) Jan. 2005 (436 pages).
ITU-T Recommendation G.992.3, "Asymmetric Digital Subscriber Line Transceivers 2 (ADSL2)" International Telecommunication Union, Apr. 2009, 404 pages.
ITU-T Recommendation G.992.3 Annex C, "Annex C: Specific Requirements for an ADSL System Operating in the Same Cable as ISDN as Defined in Appendix III of Recommendation ITU-T G.961" International Telecommunication Union, Apr. 2009, 296 pages.
ITU-T, G.993.1 (Revision), Series G: Transmission Systems and Media, Digital Systems and Networks, "Very High Speed Digital Subscriber Line Transceivers" 2004, 251 pages.
ITU-T G.994.1, Series G: Transmission Systems and Media, Digital Systems and Networks, "Handshake Procedures for Digital Subscriber Line (DSL) Transceivers" May 2003, 162 pages.
Johns, David A., et al. "Integrated Circuits for Data Transmission Over Twisted-Pair Channels" IEEE Journal of Solid-State Circuits, vol. 32, Nov. 3, Mar. 1997 (9 pages).

Nedev, Nedko H. "Analysis of the Impact of Impulse Noise in Digital Subscriber Line Systems" The University of Edinburgh, Mar. 2003 (185 pages).
Petzold, Mark C. et al. "Multicarrier Spread Spectrum Performance in Fading Channels with Serial Concatenated Convolutional Coding" IEEE 1998 (4 pages).
Sklower, K. et al. "The PPP Multilink Protocol (MP)" Network Working Group, Nov. 1994 (15 pages).
Sliskovic, Maja "Signal Processing Algorithm for OFDM Channel with Impulse Noise" IEEE, 2000 (4 pages).
Wolman, Alec et al. "Latency Analysis of TCP on an ATM Network" University of Washington, Printed Sep. 19, 2014 (14 pages).
Zhang, Liang "Error Control Coding in ADSL DMT System" University of Ottawa, Sep. 1998 (134 pages).
Zogakis, T.N., et al. "Impulse Noise Mitigation Strategies for Multicarrier Modulation" IEEE 1993 (5 pages).
International Search Report for International (PCT) Patent Application No. PCT/US2005/036815, dated Feb. 10, 2006.
Written Opinion for International (PCT) Patent Application No. PCT/US2005/036815, dated Feb. 10, 2006.
International Preliminary Report on Patentability for International (PCT) Patent Application No. PCT/US2005/036815, dated Apr. 26, 2007.
First Examination Report for Australian Patent Application No. 2005295758, dated Apr. 22, 2009.
Notice of Acceptance for Australian Patent Application No. 2005295758, dated Mar. 16, 2010.
Official Action for Canadian Application No. 2,582,106, dated Feb. 15, 2013.
Official Action for Canadian Application No. 2,582,106, dated Feb. 28, 2014.
Notice of Allowance for Canadian Application No. 2,582,106, dated Aug. 11, 2014.
Notice of Allowance for Canadian Application No. 2,881,036, dated Mar. 30, 2015.
Official Action for Canadian Application No. 2,906,478, dated Dec. 2, 2016.
Official Action for Canadian Application No. 2,906,478, dated Nov. 8, 2017.
Notice of Allowance for Canadian Application No. 2,906,478, dated Jun. 26, 2018.
Notification of the First Office Action (including translation) for Chinese Patent Application No. 200580034464.3, dated Aug. 21, 2009.
Notification of the Second Office Action (including translation) for Chinese Patent Application No. 200580034464.3, dated Apr. 13, 2010.
Notification of the Third Office Action (including translation) for Chinese Patent Application No. 200580034464.3, dated Sep. 16, 2010.
Notification of Granting a Patent Right for Chinese Patent Application No. 200580034464.3, dated Apr. 27, 2011.
Examination Report for European Patent Application No. 05810124.7, dated Feb. 5, 2009.
Examination Report for European Patent Application No. 05810124.7, dated Mar. 4, 2010.
Communication under Rule 71(3) EPC—Intent to Grant for European Patent Application No. 05810124.7, dated Jan. 27, 2012.
Extended European Search Report for European Patent Application No. 11000980.0, dated Jul. 15, 2011.
Intention to Grant for European Patent Application No. 11000980.0, dated Aug. 18, 2016.
European Search Report for European Patent Application No. 17020039.8, dated Jul. 28, 2017.
Official Action for Indian Patent Application No. 1209/KOLNP/2007, dated Apr. 30, 2013.
Notification of Reasons for Refusal (including translation) for Japanese Patent Application No. 2007-536883, dated Aug. 15, 2011.
Notification of Reasons for Refusal (including translation) for Japanese Patent Application No. 2007-536883, dated Mar. 12, 2012.
Decision of Refusal (including translation) for Japanese Patent Application No. 2007-536883, dated Dec. 17, 2012.

(56) References Cited

OTHER PUBLICATIONS

Notification of Reasons for Refusal (including translation) for Japanese Patent Application No. 2008-264567, dated Aug. 15, 2011.
Notification of Reasons for Refusal (including translation) for Japanese Patent Application No. 2008-264567, dated Mar. 12, 2012.
Dismissal of Amendment (including translation) for Japanese Patent Application No. 2008-264567, dated Dec. 25, 2012.
Decision of Refusal (including translation) for Japanese Patent Application No. 2008-264567, dated Dec. 25, 2012.
Official Action (including translation) for Korean Patent Application No. 10-2007-7008275, dated Feb. 1, 2012.
Official Action (including translation) for Korean Patent Application No. 10-2007-7008275, dated Dec. 28, 2012.
Notice of Allowance (including translation) for Korean Patent Application No. 10-2007-7008275, dated May 22, 2013.
Official Action (including translation) for Korean Patent Application No. 10-2010-7022479, dated Mar. 20, 2012.
Official Action (including translation) for Korean Patent Application No. 10-2010-7022479, dated Dec. 28, 2012.
Notice of Allowance (including translation) for Korean Patent Application No. 10-2010-7022479, dated Jul. 31, 2013.
Official Action (including translation) for Korean Patent Application No. 10-2012-7021605, dated Oct. 23, 2012.
Notice of Refusal (no translation) for Korean Patent Application No. 10-2012-7021605, dated May 23, 2013.
Official Action for U.S. Appl. No. 11/575,598, dated Dec. 17, 2009.
Notice of Allowability for U.S. Appl. No. 11/575,598, dated Jul. 30, 2010.
Official Action for U.S. Appl. No. 12/769,747, dated Dec. 8, 2011.
Official Action for U.S. Appl. No. 12/769,747, dated Sep. 27, 2012.
Official Action for U.S. Appl. No. 12/769,747, dated Nov. 22, 2013.
Notice of Allowance for U.S. Appl. No. 12/769,747, dated Aug. 18, 2014.
Official Action for U.S. Appl. No. 14/559,156, dated Mar. 13, 2015.
Official Action for U.S. Appl. No. 14/559,156, dated Aug. 26, 2015.
Official Action for U.S. Appl. No. 14/559,156, dated Feb. 1, 2016.
Official Action for U.S. Appl. No. 14/559,156, dated Oct. 17, 2016.
Notice of Allowance for U.S. Appl. No. 14/559,156, dated Jan. 20, 2017.
Official Action for U.S. Appl. No. 15/479,866, dated Jun. 14, 2018.
Official Action for U.S. Appl. No. 15/479,866, dated Mar. 21, 2019.
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Nov. 4, 2013-Nov. 30, 2015—Docket Nos. 1-100; (1722 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Dec. 16, 2015-Jan. 6, 2016—Docket Nos. 104-112; (193 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Jan. 20, 2016-Feb. 8, 2016—Docket Nos. 113-124; (252 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Feb. 9, 2016-Mar. 2, 2016—Docket Nos. 125-142; (225 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Mar. 17, 2016-Apr. 22, 2016; Docket Nos. 165-193; (152 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Feb. 25, 2016, made publically available May 25, 2016; Docket No. 140; (40 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Apr. 27, 2016-May 24, 2016; Docket Nos. 194-211; (813 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Mar. 3, 2016 made publically available Jun. 1, 2016; Docket Nos. 143; (61 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Jun. 3, 2016-Jun. 7, 2016; Docket Nos. 212-215; (138 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Jun. 27, 2016; Docket Nos. 216; (2 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Aug. 2-Aug. 23, 2016; Docket Nos. 217-219; (9 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Sep. 16, 2016; Docket Nos. 220; (2 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Sep. 26, 2016; Docket Nos. 221-222; (19 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Oct. 26, 2016-Nov. 17, 2016: Docket Nos. 223-227; (35 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Dec. 9, 2016-Feb. 3, 2017; Docket Nos. 228-236; (21 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Feb. 8, 2017 to Apr. 26, 2017; Docket Nos. 237-253; (118 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Feb. 10, 2017, made available on May 11, 2017; Docket Nos. 239; (52 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed May 2, 2017 to Jul. 14, 2017; Docket Nos. 254-299; (1080 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Jul. 24, 2017-Oct. 25, 2017; Docket Nos. 300-352; (3668 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Sep. 7, 2017, made Publicly Available on Dec. 6, 2017; Docket No. 323; (156 pages).

(56) References Cited

OTHER PUBLICATIONS

Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Oct. 30, 2017-Dec. 5, 2017; Docket Nos. 353-375; (862 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Feb. 1, 2018-Mar. 6, 2018; Docket Nos. 358, 376, and 377 (326 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents made Publicly Available on Mar. 26, 2018; Docket No. 378 (120 pages).
Defendant Zhone Technologies, Inc.'s Invalidity Contentions with Regard to Representative Asserted Claims for *TQ Delta, LLC v. Zhone Technologies, Inc.*—Including Claim Charts for FAMILY 8 with Exhibits 134-137; In the United States District Court for the District of Delaware; Civil Action No. 13-01836-RGA; filed Sep. 25, 2015 (158 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Dec. 9, 2013-Nov. 30, 2015—Docket Nos. 1-117; (1996 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Dec. 16, 2015-Dec. 16, 2015—Docket Nos. 119; (48 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jan. 20, 2016-Feb. 8, 2016—Docket Nos. 125-139; (349 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Feb. 9, 2016-Mar. 2, 2016; Docket Nos. 140-157; (223 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Mar. 17, 2016-Apr. 22, 2016; Docket Nos. 180-208; (152 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Feb. 25, 2016, made publically available May 25, 2016; Docket No. 155; (40 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Apr. 27, 2016-May 24, 2016; Docket Nos. 209-226; (809 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Mar. 3, 2016, made publically Jun. 1, 2016; Docket No. 158; (61 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jun. 3, 2016-Jun. 13, 2016; Docket Nos. 227-232; (140 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jun. 14, 2016; Docket Nos. 233; (2 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Jun. 27, 2016; Docket Nos. 235; (2 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Aug. 2, 2016-Sep. 1, 2016; Docket Nos. 236-239; (11 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Sep. 26, 2016; Docket Nos. 240-241; (19 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Oct. 26, 2016-Nov. 17, 2016; Docket Nos. 242-246; (35 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Dec. 9, 2016-Feb. 3, 2017; Docket Nos. 247-256; (23 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Feb. 8, 2017-May 1, 2017; Docket Nos. 257-273; (69 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Feb. 10, 2017, made available on May 11, 2017; Docket Nos. 259; (52 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from May 2, 2017-Jul. 14, 2017; Docket Nos. 274-320; (1080 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jul. 24, 2017-Oct. 25. 2017; Docket Nos. 321-372; (3670 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Sep. 7, 2017, made Publicly Available on Dec. 6, 2017; Docket No. 342; (156 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Oct. 27, 2017-Dec. 21, 2017; Docket Nos. 373-434; (1,843 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Feb. 1, 2018-Mar. 19, 2018; Docket Nos. 378, 407-408; and 436-502; (4,366 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents made publicly available on Mar. 26, 2018; Docket No. 435: (120 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents made publicly available on Apr. 16, 2018: Docket No. 454; (145 pages).

US 11,394,485 B2

Page 6

(56) References Cited

OTHER PUBLICATIONS

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents made publicly available on Apr. 17, 2018; Docket No. 454; (42 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents made publicly available on May 10, 2018; Docket No. 482; (52 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents made publicly available on May 14, 2018; Docket No. 485; (101 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Mar. 29, 2018-Jun. 8, 2018; Docket Nos. 503-534; (465 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents made publicly available on Jul. 12, 2018; Docket No. 513; (118 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jun. 11, 2018-Sep. 10, 2018; Docket Nos. 535-580; (272 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents made publicly available on Oct. 25, 2018; Docket No. 559; (94 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Sep. 18, 2018-Nov. 27, 2018; Docket Nos. 581-602; (302 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Dec. 3, 2018-Feb. 6, 2019; Docket Nos. 603-617; (35 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Feb. 13, 2019-May 8, 2019; Docket Nos. 618-628; (21 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from May 16, 2019-Jul. 3, 2019; Docket Nos. 629-633; (11 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Aug. 21, 2019-Oct. 2, 2019; Docket Nos. 634-638; (9 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Oct. 9, 2019-Dec. 19, 2019; Docket Nos. 639-687; (2583 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Dec. 23, 2019-Jan. 8, 2020; Docket Nos. 688-692; (12 pages).

Defendant Zyxel's Initial Invalidity Contentions with Respect to Representative Asserted Claims for *TQ Delta, LLC v. Zyxel Communications Inc. and Zyxel Communications Corporation*—Including Claim Charts for FAMILY 8 with Exhibits H1-H4; In the United States District Court for the District of Delaware; Civil Action No. 13-02013-RGA; filed Sep. 25, 2015 (147 pages).

Defendant Zyxel's Technologies, Inc.'s Final Invalidity Contentions in Response to Plaintiff's Dec. 8, 2016 Final Infringement Charts Regarding Non-Broadcom Products for *TQ Delta, LLC v. Zyxel Communications Inc. and Zyxel Communications Corporation* Including Claim Charts for FAMILY 8 with Exhibits H1-H4; in the United States District Court for the District of Delaware; Civil Action No. 13-02013-RGA; filed Jan. 23, 2017 (140 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jul. 17, 2014-Oct. 19, 2015—Docket Nos. 1-65; (2,489 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jan. 20, 2016-Feb. 8, 2016—Docket Nos. 67-68; (81 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Feb. 9, 2016-Mar. 1, 2016 Docket Nos. 69-72; (13 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Mar. 28, 2016-May 31, 2016—Docket Nos. 74-77; (8 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Mar. 8, 2016, made publically available Jun. 6, 2016—Docket No. 73; (60 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jun. 7, 2016-Jun. 8, 2016; Docket Nos. 78-80; (73 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jun. 15, 2016; Docket Nos. 81; (2 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed on Jun. 27, 2016; Docket Nos. 82; (2 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Aug. 2-Sep. 1, 2016; Docket Nos. 83-86; (11 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Nov. 4, 2016-Nov. 17, 2016; Docket Nos. 87-90; (11 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Dec. 9, 2016-Feb. 3, 2017; Docket Nos. 91-99; (19 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Feb. 8, 2017-May 1, 2017; Docket Nos. 100-118; (128 pages).

(56) References Cited

OTHER PUBLICATIONS

Documents filed with District Court Proceedings for *TQ Delta, LLC v. Adtran Inc.*; U.S. District Court, for the District of Delaware (Wilmington); Civil Action No. 1:14-cv-00954-RGA;Includes documents filed on Feb. 10, 2017, made available on May 11, 2017; Docket Nos. 102; (52 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from May 2, 2017-Jul. 14, 2017; Docket Nos. 119-167; (1087 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jul. 21, 2017-Oct. 26, 2017; Docket Nos. 168-233; (4038 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Sep. 7, 2017, made Publicly Available on Dec. 6, 2017; Docket No. 197; (157 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Oct. 27, 2017-Dec. 21, 2017; Docket Nos. 234-290; (1664 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Feb. 1, 2018-Mar. 19, 2018; Docket Nos. 242; 266-267; and 292-359 (4,228 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents made publicly available on Mar. 26, 2018; Docket No. 291 (120 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents made publicly available on Apr. 16, 2018; Docket No. 310 (145 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents made publicly available on May 10, 2018; Docket No. 338 (52 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents made publicly available on May 14, 2018; Docket No. 342 (101 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Mar. 29, 2018-Jun. 7, 2018; Docket Nos. 360-419 (956 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents made publicly available on Jul. 12, 2018; Docket Nos. 370-371 (181 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jul. 3, 2018-Sep. 10, 2018; Docket Nos. 420-491 (696 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents made publicly available on Oct. 25, 2018; Docket No. 462 (94 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Sep. 18, 2018-Nov. 21, 2018; Docket Nos. 492-524 (486 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Dec. 3, 2018-Feb. 6, 2019; Docket Nos. 525-553 (543 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Feb. 22, 2019-May 9, 2019; Docket Nos. 554-573 (36 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from May 10, 2019-Jul. 16, 2019; Docket Nos. 574-657 (1435 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jul. 17, 2019-Sep. 27, 2019; Docket Nos. 658-838 (7239 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Sep. 30, 2019-Oct. 8, 2019; Docket Nos. 839-877 (344 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Oct. 9, 2019-Dec. 20, 2019; Docket Nos. 878-930 (1152 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents made publicaly available on Jan. 28, 2020; Docket No. 908 (41pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Dec. 23, 2019-Feb. 13, 2020; Docket Nos. 931-947 (33 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Feb. 18, 2020-Feb. 19, 2020; Docket Nos. 948-951 (7 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Feb. 25, 2020-May 22, 2020; Docket Nos. 952-1082 (4256 pages).

Defendant Adtran, Inc.'s Preliminary Invalidity Contentions with Regard to Representative Asserted Claims for *TQ Delta, LLC v. Adtran Inc.*—Including Claim Charts for FAMILY 8 as Exhibits 8-1-8-4; U.S. District Court, for the District of Delaware (Wilmington); Civil Action No. 1:14-cv-00954-RGA and Civil Action No. 1:15-cv-00121-RGA; filed Feb. 9, 2016 (174 pages).

Defendant Adtran, Inc.'s Invalidity Contentions in Response to TQ Delta's Dec. 8, 2016 Final Infringement Contentions for *TQ Delta, LLC v. Adtran Inc.*—Including Claim Charts for FAMILY 8 as Exhibits 8-1-8-4; U.S. District Court, for the District of Delaware (Wilmington); Civil Action No. 1:14-cv-00954-RGA and Civil Action No. 1:15-cv-00121-RGA; filed Jan. 23, 2017 (100 pages).

Documents filed with District Court Proceedings for *Adtran Inc. v. TQ Delta, LLC*; U.S. District Court, for the District of Delaware

(56) References Cited

OTHER PUBLICATIONS (Wilmington); Civil Action No. 1:15-cv-00121-RGA; Includes documents filed from Jul. 17, 2014-Mar. 1, 2016 Docket Nos. 1-77; (1,444) pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Mar. 28, 2016-May 31, 2016; Docket Nos. 79-82; (8 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents on Mar. 8, 2016 made publically available Jun. 6, 2016; Docket Nos. 78; (60 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Jun. 7, 2016-Jun. 8, 2016; Docket Nos. 83-85; (73 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Jun. 15, 2016; Docket Nos. 86; (2 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed on Jun. 27, 2016; Docket Nos. 87; (2 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Aug. 2-Sep. 1, 2016; Docket Nos. 88-91; (11 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Nov. 4, 2016-Nov. 17, 2016; Docket Nos. 92-95; (11 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Dec. 9, 2016-Feb. 3, 2017; Docket Nos. 96-104 (19 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Feb. 8, 2017-May 1, 2017; Docket Nos. 105-122 (118 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed on Feb. 10, 2017, made available on May 11, 2017; Docket Nos. 107; (52 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from May 2, 2017-Jul. 14, 2017; Docket Nos. 122-169 (1083 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Jul. 21, 2017-Oct. 26, 2017; Docket Nos. 170-235 (4150 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Sep. 7, 2017, made Publicly Available on Dec. 6, 2017; Docket No. 199; (157 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Oct. 27, 2017-Dec. 21, 2017; Docket Nos. 236-291 (1662 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Feb. 1, 2018-Mar. 19, 2018; Docket Nos. 242, 267-268, and 293-360 (4,228 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents made publicly available on Mar. 26, 2018; Docket No. 292 (120 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents made publicly available on Apr. 16, 2018; Docket No. 313 (145 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents made publicly available on May 10, 2018; Docket No. 341 (52 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents made publicly available on May 14, 2018; Docket No. 345 (101 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Mar. 29, 2018-Jun. 7, 2018; Docket Nos. 361-420 (956 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents made publicly on Jul. 12, 2018; Docket Nos. 371-372 (181 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Jun. 11, 2018-Sep. 10, 2018; Docket Nos. 421-490 (693 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents made publicly available on Oct. 25, 2018; Docket No. 463 (94 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Sep. 18, 2018-Nov. 21, 2018; Docket Nos. 491-523 (486 pages).
Documents filed with District Court Proceedings for *Adtran Inc.* v. *TQ Delta, LLC*; U.S. District Court, for the District of Delaware (Wilmington); Civil Action No. 1:15-cv-00121-RGA, Includes documents filed from Dec. 3, 2018-Feb. 6, 2019; Docket Nos. 524-552 (543 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Feb. 22, 2019-May 9, 2019; Docket Nos. 553-571 (35 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from May 10, 2019-Jul. 16, 2019; Docket Nos. 572-653 (1433 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Jul. 17, 2019-Sep. 30, 2019; Docket Nos. 654-839 (7268 pages).

(56) References Cited

OTHER PUBLICATIONS

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Oct. 1, 2019-Oct. 8, 2019; Docket Nos. 840-874 (316 pages).

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Oct. 9, 2019-Dec. 20, 2019; Docket Nos. 875-926 (1151 pages).

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents made publicaly avaliable on Jan. 28, 2020; Docket No. 905 (41 pages).

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Dec. 23, 2019-Feb. 13, 2020; Docket Nos. 927-943 (33 pages).

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Feb. 18, 2020-Feb. 19, 2020; Docket Nos. 944-947 (7 pages).

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Feb. 25, 2020-May 22, 2020; Docket Nos. 948-1078 (4,256 pages).

Documents filed with District Court Proceedings for *Adtran Inc.* vs. *TQ Delta, LLC*; U.S. District Court, for the Northern District of Alabama (Northeastern); Civil Action No. 5:14-cv-01381-JEO; Includes documents filed from Jul. 17, 2014-Jan. 27, 2015—Docket Nos. 1-32; (568 pages).

Documents filed with District Court Proceedings for *TQ Delta, LLC* v. *Adtran Inc.*; U.S. District Court, for the District of Delaware (Wilmington); Civil Action No. 1:14-cv-00954-RGA; Includes documents filed from May 26, 2020-Jul. 23, 2020; Docket Nos. 1083-1178 (1,901 pages).

Documents filed with District Court Proceedings for *TQ Delta, LLC* v. *Adtran Inc.*; U.S. District Court, for the District of Delaware (Wilmington); Civil Action No. 1:14-cv-00954-RGA; Includes documents made publicly available on Aug. 7, 2020; Docket No. 1068 (50 pages).

Documents filed with District Court Proceedings for *TQ Delta, LLC* v. *Adtran Inc.*; U.S. District Court, for the District of Delaware (Wilmington); Civil Action No. 1:14-cv-00954-RGA; Includes documents filed from Jul. 28, 2020-Aug. 26, 2020; Docket Nos. 1179-1213 (472 pages).

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from May 26, 2020-Jul. 23, 2020; Docket Nos. 1079-1173 (1,885 pages).

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents made publicly available on Aug. 7, 2020; Docket No. 1064 (50 pages).

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed on Jul. 28, 2020; Docket Nos. 1174-1177 (23 pages).

European Search Report for European Patent Application No. 17020039.8, dated Jan. 12, 2021.

Documents filed with District Court Proceedings for *TQ Delta, LLC* v. *Adtran Inc.*; U.S. District Court, for the District of Delaware (Wilmington); Civil Action No. 1:14-cv-00954-RGA; Includes documents filed from Aug. 28, 2020-Dec. 21, 2020; Docket Nos. 1214-1267 (310 pages).

Documents filed with District Court Proceedings for *TQ Delta, LLC* v. *Adtran Inc.*; U.S. District Court, for the District of Delaware (Wilmington); Civil Action No. 1:14-cv-00954-RGA; Includes documents filed from Dec. 28, 2020-Apr. 1, 2021; Docket Nos. 1268-1326 (1,003 pages).

Documents filed with District Court Proceedings for *TQ Delta, LLC* v. *Adtran Inc.* ; U.S. District Court, for the District of Delaware (Wilmington); Civil Action No. 1:14-cv-00954-RGA; Includes documents filed from Apr. 28, 2022-May 19, 2022; (11 pages).

European Search Report for European Patent Application No. 17020039.8, dated Apr. 28, 2022.

* cited by examiner

DMT SYMBOL REPETITION IN THE PRESENCE OF IMPULSE NOISE

RELATED APPLICATION DATA

This application is a Continuation of U.S. Application Ser. No. 15/479,866, filed Apr. 5, 2017, which is a Continuation of U.S. application Ser. No. 14/559,156, filed Dec. 3, 2014, now U.S. Pat. No. 8,913,649, which is a Continuation of U.S. application Ser. No. 12/769,747, filed Apr. 29, 2010, now U.S. Pat. No. 8,913,649, which is a Continuation of U.S. application Ser. No. 11/575,598, filed Mar. 20, 2007, now U.S. Pat. No. 7,769,705, which is a national stage application under 35 U.S.C. 371 of PCT Application No. PCT/US2005/036815, filed Oct. 14, 2005, which claims the benefit of and priority under 35 U.S.C. § 119(e) to U.S. Patent Application No. 60/619,618, filed Oct. 15, 2004, entitled "xDSL Initialization in the Presence of Impulse Noise," each of which are incorporated herein by reference in their entirety.

BACKGROUND

Field of the Invention

This invention generally relates to communication systems. More specifically, an exemplary embodiment of this invention relates to an initialization technique for communication systems. Another exemplary embodiment relates to error detection and correction during initialization.

Description of Related Art

Communication systems often operate in environments with impulse noise. Impulse noise is a short-term burst of noise that is higher than the normal noise that typically exists in the communication channel. For example, DSL systems operate on telephone lines and experience impulse noise from many external sources including telephones, AM radio, HAM radio, other DSL services on the same line or in the same bundle, other equipment in the home, etc. It is common practice for communication systems to use interleaving in combination with Forward Error Correction (FEC) to correct the errors caused by the impulse noise during user data transmission, i.e., SHOWTIME.

SUMMARY

Standard initialization procedures in xDSL systems, such as those specified in ADSL ITU G.992 standards and VDSL ITU G.993 standards, are designed to optimize performance, such as data rate/reach, in the presence of "stationary" crosstalk or noise. Impulse noise protection is handled with Interleaving/FEC during data transmission mode, known as "SHOWTIME" in ADSL and VDSL systems, but the current xDSL initialization procedures, also known as "training procedures," are not designed to operate in an environment with high levels of impulse noise. As an example, there are several messages exchanged during initialization in ADSL and VDSL ITU standards that are not designed to work well in an environment with high levels of impulse noise. For example, in the ADSL2 G.992.3 standards, there are initialization messages such as R-MSG-FMT, C-MSG-FMT, R-MSG-PCB, C-MSG-PCB, R-MSG1, C-MSG1, R-MSG2, C-MSG2, R-PARAMS, C-PARAMS, etc., which use modulation techniques that do not provide high levels of immunity to impulse noise. Likewise, for example, in the VDSL1 G.993.1 standards, there are initialization messages such as O-SIGNATURE, O-UODATE, O-MSG1, O-MSG2, O-CONTRACT, O-B&G, R-B&G, R-MSG1, R-MSG2, etc., which use modulation techniques that do not provide high levels of immunity to impulse noise. Additionally, G.994.1 (G.hs), which is used as part of the initialization procedure for most xDSL standards, uses modulation techniques that do not provide high levels of immunity to impulse noise. In particular, a receiver will not be able to correctly demodulate/decode the message information when only 1 DMT symbol is corrupted by impulse noise. This is especially problematic because xDSL systems are generally designed to be able to pass steady-state ("SHOWTIME") data without errors in the presence of impulse noise by configuring a parameter called Impulse Noise Protection (INP). INP is defined in the ADSL2 and VDSL2 standards as the number of consecutive DMT symbols that, when completely corrupted by impulse noise, can be completely corrected by the receiver using FEC and interleaving during SHOWTIME. For example, if INP=2, then if 2 (or less) SHOWTIME DMT symbols are corrupted by impulse noise, the interleaving and FEC coding will be configured to be able to correct all the resulting bit errors. This means that with the current initialization procedures defined in the VDSL and ADSL standards, even though the xDSL system could operate in SHOWTIME in an impulse noise environment where 2 DMT symbols are being corrupted, the transceivers would not be able to reach SHOWTIME because initialization would fail due to initialization message failure.

Accordingly, an exemplary aspect of this invention relates to an improved initialization procedure for communication systems that operate in environments with higher levels of impulse noise.

More specifically, an exemplary aspect of this invention relates to an initialization sequence where the messages exchanged during initialization are designed to operate in environments with higher levels of impulse noise.

Additional exemplary aspects of the invention relate to repeating DMT symbols within initialization messages.

Additional exemplary aspects of the invention relate to duplicating and repeating DMT symbols within initialization message(s).

Additional exemplary aspects of the invention relate to copying and repeating DMT symbols within initialization message(s).

Additional exemplary aspects of the invention relate to repeating the transmission of DMT symbols that are used to modulate initialization message information bits to correctly receive the messages in an environment with impulse noise.

Further exemplary aspects of the invention relate to using forward error correction to encode and decode initialization messages during initialization.

Aspects of the invention further relate to using forward error correction and interleaving to encode and decode initialization messages during initialization.

Still further aspects of the invention relate to using error detection techniques such as Cyclic Redundancy Checksum (CRC) on portions of an initialization message during initialization.

Additional exemplary aspects of the invention relate to using error detection techniques, such as CRC on portions of the bits in an initialization message to correctly determine which DMT symbols are corrupt.

Aspects of the invention also relate to utilizing error detection techniques, such as CRC, on portions of the bits in an initialization message to determine which bits are in error in a long message.

Aspects of the invention also relate to analyzing initialization message length to dynamically determine the type(s) of initialization message error detection and correction to be used.

Further aspects of the invention relate to using error detection techniques, such as CRC, on portions of the bits in an initialization message and message retransmission to correctly receive messages during initialization.

Additional exemplary aspects of the invention also relate to utilizing error detection techniques such as CRC on portions of the bits in any message or signal to determine which DMT symbols are corrupted by impulse noise during initialization.

Additional exemplary aspects of the invention relate to transmitting and/or receiving repeated DMT symbols with at least one CRC bit on each DMT symbol.

These and other features and advantages of this invention are described in, or are apparent from, the following detailed description of the exemplary embodiments.

BRIEF DESCRIPTION OF THE DRAWINGS

The exemplary embodiments of the invention will be described in detail, with reference to the following figures wherein.

DETAILED DESCRIPTION

Figure 1:
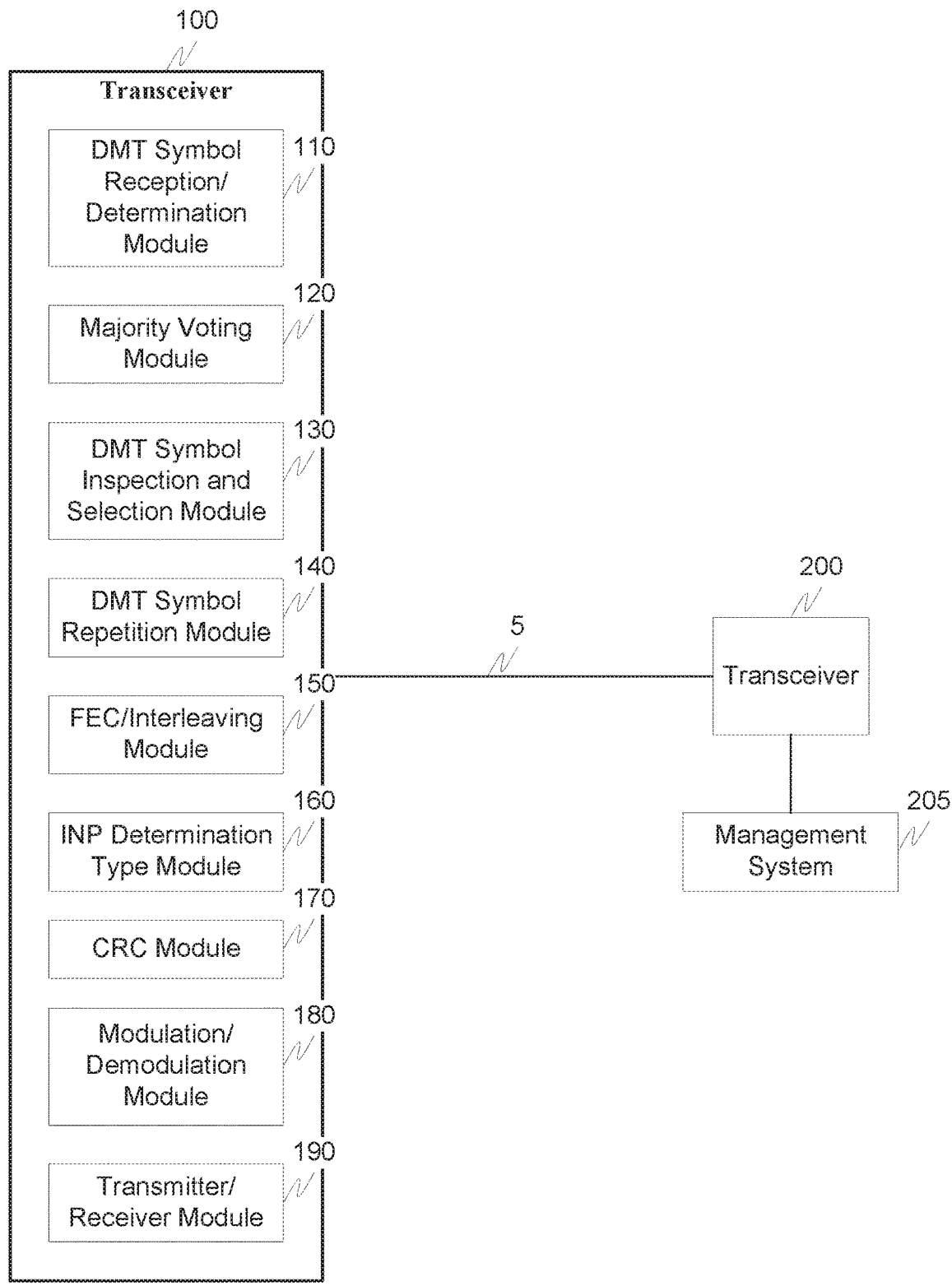
FIG. 1 is a functional block diagram illustrating an exemplary embodiment of this invention.

The exemplary embodiments of this invention will be described in relation to initialization in a wired and/or wireless communications environment, such as a DSL communication system. However, it should be appreciated, that in general, the systems and methods of this invention will work equally well for any type of communication system or protocol in any environment.

The exemplary systems and methods of this invention will also be described in relation to multicarrier modems, such as DSL modems and VDSL modems, and associated communications hardware, software and communication channels. However, to avoid unnecessarily obscuring the present invention, the following description omits well-known structures and devices that may be shown in block diagram form or otherwise summarized.

For purposes of explanation, numerous details are set forth in order to provide a thorough understanding of the present invention. It should be appreciated however that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a telecommunications network and/or the Internet, or within a dedicated secure, unsecured and/or encrypted system. Thus, it should be appreciated that the components of the system can be combined into one or more devices, such as a modem, or collocated on a particular node of a distributed network, such as a telecommunications network. As will be appreciated from the following description, and for reasons of computational efficiency, the components of the system can be arranged at any location within a distributed network without affecting the operation of the system. For example, the various components can be located in a Central Office modem (CO, ATU-C, VTU-O), a Customer Premises modem (CPE, ATU-R, VTU-R), a DSL management device, or some combination thereof. Similarly, one or more functional portions of the system could be distributed between a modem and an associated computing device.

Furthermore, it should be appreciated that the various links, including communications channel 5, connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique. Transmitting modem and transmitting transceiver as well as receiving modem and receiving transceiver are used interchangeably herein.

FIG. 1 illustrates an exemplary communication system. Communication system 10 comprises a first transceiver 100 and a second transceiver 200. The transceivers 100 and 200 each comprise a DMT symbol reception/determination module 110, a majority voting module 120, a DMT symbol inspection and selection module 130, a DMT symbol repetition module 140, a FEC/interleaving module 150, an INP determination type module 160, a CRC module 170, a modulation/demodulation module 180 and a transmitter/receiver module 190. It should be appreciated that numerous components of the transceiver have been omitted for clarity. However, the transceivers 100 and 200 can also include the standard components of a typical communications device(s).

In general, the systems and methods of this invention will be described in relation to transceivers in a DSL communications environment. However, it should be appreciated that the techniques illustrated herein can be implemented into any wired or wireless communication system.

In accordance with a first exemplary embodiment, DMT symbols that are used to modulate initialization messages are sent a plurality of times. Due to this repeated transmission, if one or more of the DMT symbols are corrupted by impulse noise, the transceiver receiving the DMT symbols can still recover the information therefrom. More specifically, and in cooperation with the DMT symbol repetition module 140, the majority voting module 120 and the modulation/demodulation module 180, a DMT symbol is repeated without modification with the receiving transceiver using a variety of detection/demodulation schemes to recover the message information bits. For example, the receiving transceiver could use a "majority voting" scheme where each DMT symbol is demodulated independently and then the message information bits recovered by examining how many DMT symbols carry the same bit pattern. Alternatively, for example, the DMT symbols could be examined by the DMT symbol inspection and selection module 130 prior to demodulation in the frequency or time domain and based on these signals, the transceiver that received the DMT symbols, in cooperation with the DMT symbol inspection selection module 130, selects the most likely DMT symbol to be correct. For example, if a DMT symbol was repeated four times and one DMT symbol was corrupted by impulse noise, then the receiving transceiver could examine the four DMT symbols in the frequency domain and clearly detect that one of the four symbols has very different phase and/or amplitude characteristics than the other three DMT symbols. Based on this difference, the receiving transceiver could discard the one DMT symbol that is corrupt and use the remaining three DMT symbols to demodulate and recover the information. Moreover, in order to randomize the signal transmitted from the transmitting transceiver, the repeated DMT symbols can use phase or bit scrambling. With phase scrambling, the repeated DMT symbols can use different phase shifts on the subcarriers in order to randomize the signal. With bit scrambling, the information bits can be scrambled prior to modulating the bits on the repeated DMT symbols.

In accordance with another exemplary embodiment, the number of repeated symbols can be determined based on the SHOWTIME Impulse Noise Protection (INP) requirements. For example, if the SHOWTIME INP=2, then DMT symbols carrying initialization messages would be repeated during initialization at least INP*2+1=5 times. This way, even if two DMT symbols were corrupted by impulse noise, there would be three remaining uncorrupted DMT symbols received by the receiving transceiver. Then, for example, and with the cooperation of the majority voting module 120, a majority voting scheme could be applied to correctly demodulate and recover the DMT symbol(s) without errors. Other algorithms could also be used to derive the number of repeated DMT symbols from the INP value. For example, the number of repeated DMT symbols could be set to A*INP+B where A and B are integers.

In accordance with an exemplary embodiment, and with the cooperation of the DMT symbol repetition/determination module 110, a receiving modem determines the number of repeated DMT symbols and informs the transmitting modem thereof. For example, the receiving modem could receive an INP value from one or more of a second transceiver or a management system. Based on this received INP value, and in cooperation with the DMT symbol repetition module 140, the number of repeated DMT symbols (M) for initialization messages is determined. This determination may be based on impulse noise measurements made by the receiving transceiver or may be based on the received INP value or both. For example, if the INP value is used, M may be equal to INP*2+1. The message indicating the determined number of repeated DMT symbols (M) is then transmitted to a second transceiver. Therefore, during initialization, the message bits are modulated onto the M repeated DMT symbols.

For example, in an alternative embodiment, a transmitting modem, with the cooperation of the DMT symbol repetition/determination module 110, could determine the number of repeated DMT symbols and send a message to the receiving modem indicating the value. This determination can be based on impulse noise measurements, based on a received INP value, or both. Moreover, a management system 205 could determine one or more of the INP value and the number of repeated DMT symbols and configure the transceivers for their use. This determination could be based on impulse noise measurements or may be based on the received INP value or both.

DSL systems often use FEC and interleaving during SHOWTIME to correct errors from impulse noise. In accordance with an exemplary embodiment of this invention, and with the cooperation of the FEC/Interleaving module 150, FEC can be utilized with or without interleaving to correct impulse noise that may corrupt messages during the initialization process. For example, prior to modulating information bits of an initialization message, the message information bits could be encoded using any FEC technique, such as Reed Solomon codes, hamming codes, convolution codes, trellis codes, turbo codes, LDPC codes, or the like. At the receiving modem, the FEC coding could be used to correct errors from impulse noise. For example, initialization messages could be encoded with a Reed Solomon code using the codeword size N=K+R bytes, containing K message information bytes and R FEC check bytes. This code can correct R/2 bytes. For example, if each DMT symbol is used to modulate 1 byte, and a R-S code with N=6 and R=4 is used, then the decoder at the receiving modem would be able to correct R/2=2 bytes in each codeword. This corresponds to correcting two DMT symbols, assuming each DMT symbol carries one byte. This would lead to the ability of the receiving modem being able to correctly recover the message information bits even if impulse noise corrupted two DMT symbols. Additionally, interleaving could be used to provide better immunity to impulse noise. For example, interleaving of multiple codewords could be used to spread the errors from impulse noise over multiple codewords thereby enabling the receiving transceiver to correct impulse noise events that corrupt even more DMT symbols.

For example, two DMT symbols with N=6 and R=4 could be interleaved, in cooperation with the FEC/interleaving module 150, by transmitting one byte from the first codeword and then transmitting one byte from the second codeword and continuing to alternate transmission in this manner. In this case, assuming each DMT symbol carries one byte, an impulse noise that corrupted four consecutive DMT symbols would be correctable by the receiver because four consecutive DMT symbols would always be divided between two codewords with each codeword having the ability to correct two bytes, or two DMT symbols.

During initialization, messages of various lengths are transmitted between the two transceivers 100 and 200. Some of these messages are longer than others with longer messages, due to their length, being more susceptible to impulse noise corruption. In accordance with another exemplary embodiment, and in cooperation with the INP determination type module 160, the type of impulse noise protection can be determined based, for example, on the length of the message being transmitted. For example, long initialization messages, such as C/R-PARAMS in ADSL, C/R-B&G in VDSL and G.994.1 messages are particularly problematic when transmitted in the presence of impulse noise. This is because when a message is long, it is very likely that some portion of the message will be corrupted by impulse noise and not be correctly recovered by the receiving modem. Although conventional DSL systems use standard error detection methods, such as CRC, CRC covers the entire message and does not provide any information regarding which bits, or DMT symbols, were corrupted by the impulse noise. Thus, when a CRC error is detected in a message in conventional DSL systems, the whole message is simply resent by the transmitting modem. However, in an environment with high impulse noise, the retransmitted message could be received in error as well and the retransmission process repeated without success. With the cooperation of the CRC module 170, additional error detection capability can be added to messages to enable the location of bit errors in longer messages. For example, and in cooperation with the CRC module 170, a one-byte CRC could be determined for each byte of the message. The CRC byte and the information could be modulated and transmitted, with the cooperation of the modulation/demodulation module 180 and transmitter/receiver module 190, on one DMT symbol. In this example, one DMT symbol is carrying two bytes.

At the receiving modem, the two bytes are demodulated and the CRC byte is used to detect if there was impulse noise corrupting the associated DMT symbol. If the CRC indicates there are no errors, then the receiving modem correctly received the message byte. If the CRC shows that there are errors, then the receiving modem needs to receive the DMT symbol again, with the cooperation of the DMT symbol reception module 140, in order to correctly recover the information. In this example, one CRC byte is transmitted with one information byte on each DMT symbol and the receiver can demodulate the entire message in this manner.

If impulse noise has corrupted some of the DMT symbols in the longer message, the message can be retransmitted and the receiving modem perform a CRC check on the previously corrupted DMT symbols to determine if they are now received without errors. Since impulse noise is typically uncorrelated with the transmitted message signal, it is highly likely that different DMT symbols will be corrupted when the signal is retransmitted, which means that the receiving modem will probably receive the previously corrupted DMT symbols without errors the second time that the message is transmitted. In the unlikely event that the same DMT symbols are still in error, the message could be retransmitted over and over until all DMT symbols are received without errors. It is possible upon retransmission that the impulse noise will cause errors in different DMT symbols than in the previous transmission. Therefore, the receiving modem could store the correctly recovered message bits for DMT symbols from the previously received message. The receiver can also store all the previously received message bits that were received without error and simply utilize the retransmitted message to correctly determine the message bits and the DMT symbols that were in error previously.

For example, the receiving modem can send a message to the transmitting modem requesting the transmitting modem to retransmit only a portion of the message that was previously received in error.

While the examples above describe computing a CRC and adding a CRC byte to each byte in the message, a plurality of CRC bits could be computed for any number of bits in the message and transmitted to a receiving modem. Moreover, although the examples above describe modulating two bytes in each DMT symbol, any number of bits can be modulated on each DMT symbol. Although the examples above describe transmitting one CRC byte in every DMT symbol, any number of CRC bits can be modulated on each DMT symbol including, but not limited to, CRC bits being carried on only a subset of the DMT symbols. For this case, some DMT symbols may not have any CRC bits. As an example, one CRC byte could be computed for each four message bytes and each DMT symbol could carry one byte. In this case, the first four DMT symbols would be used to modulate the message bytes and the fifth DMT symbol would carry the CRC byte. At the receiving modem, the CRC would be used to detect if any of the five DMT symbols were corrupted by impulse noise. If the CRC showed an error has occurred, then the retransmission techniques described above could be used.

In another exemplary embodiment, the DMT symbol repetition and error detection capabilities are combined to combat impulse noise on the communications line. For example, if a DMT symbol is repeated M times, and a CRC byte is transmitted with every DMT symbol, then the receiving modem could use the CRC byte to determine if each DMT symbol was being correctly demodulated. In this case, a majority voting scheme, or other frequency/time domain impulse noise detection method, such as those discussed above, would not necessarily be required. One advantage of this method is that it may require repeating a fewer number of DMT symbols. For example, if the impulse noise corrupts one DMT symbol, a majority-voting scheme, in conjunction with the majority voting module 120, would require at least three DMT symbols to make a decision. However, if a CRC byte was sent with each DMT symbol, then only two repeated DMT symbols would be necessary since the CRC, with the assistance of the CRC module 170, would correctly identify the uncorrupted DMT symbol and discard the corrupted DMT symbol. If the INP value was being used to determine the number of repeated DMT symbols, then this method may require repeating a fewer number of DMT symbols. For example, it may be necessary to only repeat INP+1 DMT symbols, as opposed to 2*INP+1 in the case where a CRC is not used. Illustratively, if INP=2, then it may be necessary to only transmit INP+1=3 repeated DMT symbols since the CRC byte could be used to detect the one correct DMT symbol and discard the two corrupted DMT symbols.

In accordance with an exemplary embodiment, the receiving modem determines the number of repeated DMT symbols and informs the transmitting modem thereof. In this exemplary embodiment, an INP value is received from a second transceiver or a management system 205. The number of repeated DMT symbols (M) is determined for the initialization messages in cooperation with the DMT symbol repetition module 140. This determination may be based on impulse noise measurements made by, for example, a receiving transceiver, or may be based on the received INP value or both. For example, if the INP value is used, M may be equal to INP+1. A message is then transmitted, with the cooperation of the transmitter/receiver module 190 to the transmitting modem indicating the determined number of repeated DMT symbols (M). Therefore, during initialization, the modem would receive messages wherein the message bits are modulated onto the M repeated DMT symbols with each DMT symbol containing at least one CRC bit for error detection.

For the transmitting modem, the transmitting modem would receive a message indicating the determined number of repeated DMT symbols and, during initialization, modulate at least one message bit onto a DMT symbol and transmit the DMT symbol (M) times, wherein each DMT symbol contains at least one CRC bit for error detection.

Alternatively, the transmitting modem could determine a number of repeated DMT symbols and send a message to the receiving modem. As described above, this determination could be based on impulse noise measurements or may be based on the received INP value or both.

Still alternatively, a management system could determine the number of DMT symbols and configure the transceivers accordingly. As described above, this determination may be made based on impulse noise measurements made by the receiving transceiver or may be based on the received INP value or both. While the above-described exemplary embodiments are illustrated independently of one another, it should be appreciated the various techniques can be combined in whole or in part.

Figure 2:
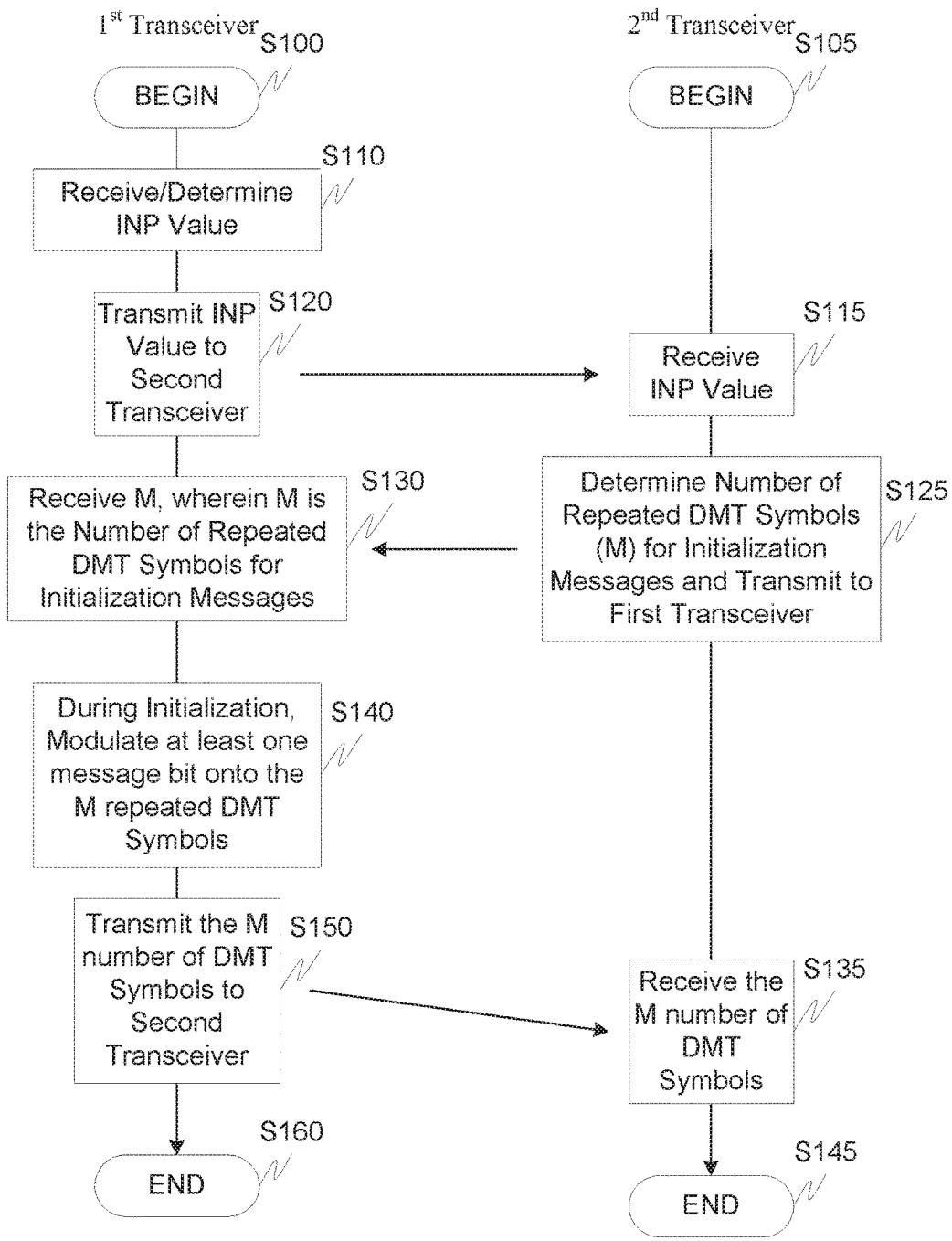
FIG. 2 is a flowchart outlining an exemplary embodiment for initializing a communication system according to this invention.

FIG. 2 illustrates an exemplary initialization methodology and communication between first and second transceivers. More specifically, for the first transceiver, control begins in step S100 and continues to step S110. In step S110, an INP value is determined or, for example, received from a management system or another transceiver.

Next, in step S120, the INP value is transmitted to the second transceiver. Then, in step S130, a value M is received by the first transceiver where M is the number of repeated DMT symbols for initialization messages. Control then continues to step S140.

In step S140, and during initialization, the first transceiver modulates at least one message bit onto the M repeated DMT symbols. Next, in step S150, the M number of DMT symbols are transmitted to the second transceiver. Control then continues to step S160 where the control sequence ends.

For the second transceiver, control begins in step S105 and continues to step S115. In step S115 an INP value is received. Next, in step S125, the number of repeated DMT symbols (M) is determined for use in initialization and the value M transmitted to the first transceiver. Then, in step S135, the second transceiver receives the M number of repeated DMT symbols. Control then continues to step S145 where the control sequence ends.

As with the previously discussed embodiments, and while not specifically illustrated in the flowchart, additional error detection capability can also be added to initialization message(s) to enable the location of bit errors. For example, each DMT symbol could also include at least one CRC bit, which can be used to detect if the DMT symbol is received correctly or in error. However, this embodiment is not limited thereto and any error detection technique in any configuration will work with the invention.

Figure 3:
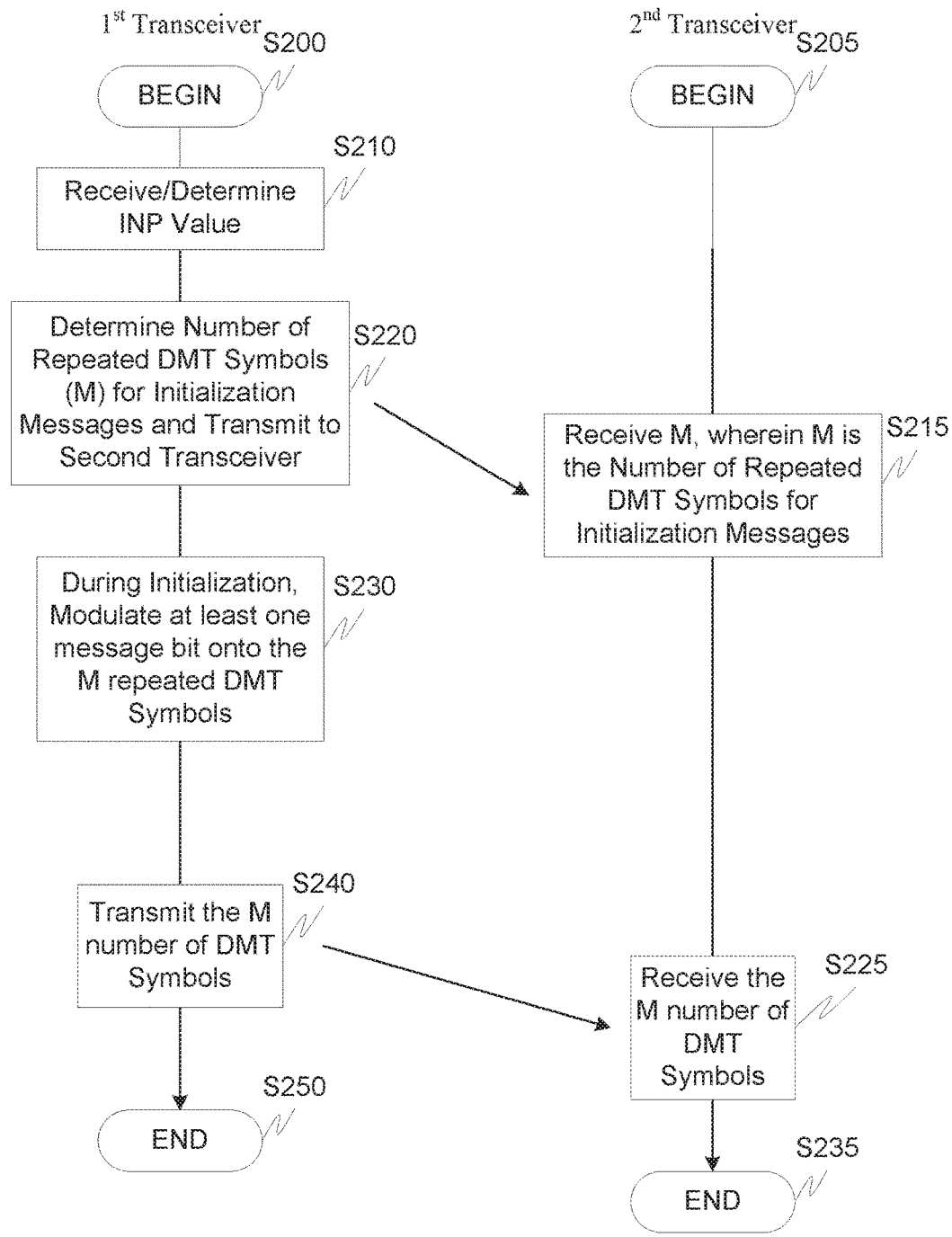
FIG. 3 is a flowchart outlining a second exemplary embodiment for initializing a communication system according to this invention.

FIG. 3 illustrates a second exemplary methodology and communication between transceivers for initialization. More specifically, for the first transceiver, control begins in step S200 and continues to step S210. In step S210, an INP value is determined or, for example, received from a management system or another transceiver. Next, in step S220, the number repeated DMT symbols (M) for initialization messages is determined and transmitted to a second transceiver. Then, in step S230, and during initialization, at least one message bit is modulated onto the M repeated DMT symbols. Control then continues to step S240.

In step S240, the M symbols are transmitted to the second transceiver. Control then continues to step S250 where the control sequence ends.

For the second transceiver, control begins in step S205 and continues to step S215. In step S215, the value for M is received. Next, in step S225, the M number of DMT symbols are received. Control then continues to step S235 where the control sequence ends.

As with the previously discussed embodiments, and while not specifically illustrated in the flowchart, additional error detection capability can also be added to initialization message(s) to enable the location of bit errors. For example, each DMT symbol could also include at least one CRC bit, which can be used to detect if the DMT symbol is received correctly or in error. However, this embodiment is not limited thereto and any error detection technique in any configuration will work with the invention.

Figure 4:
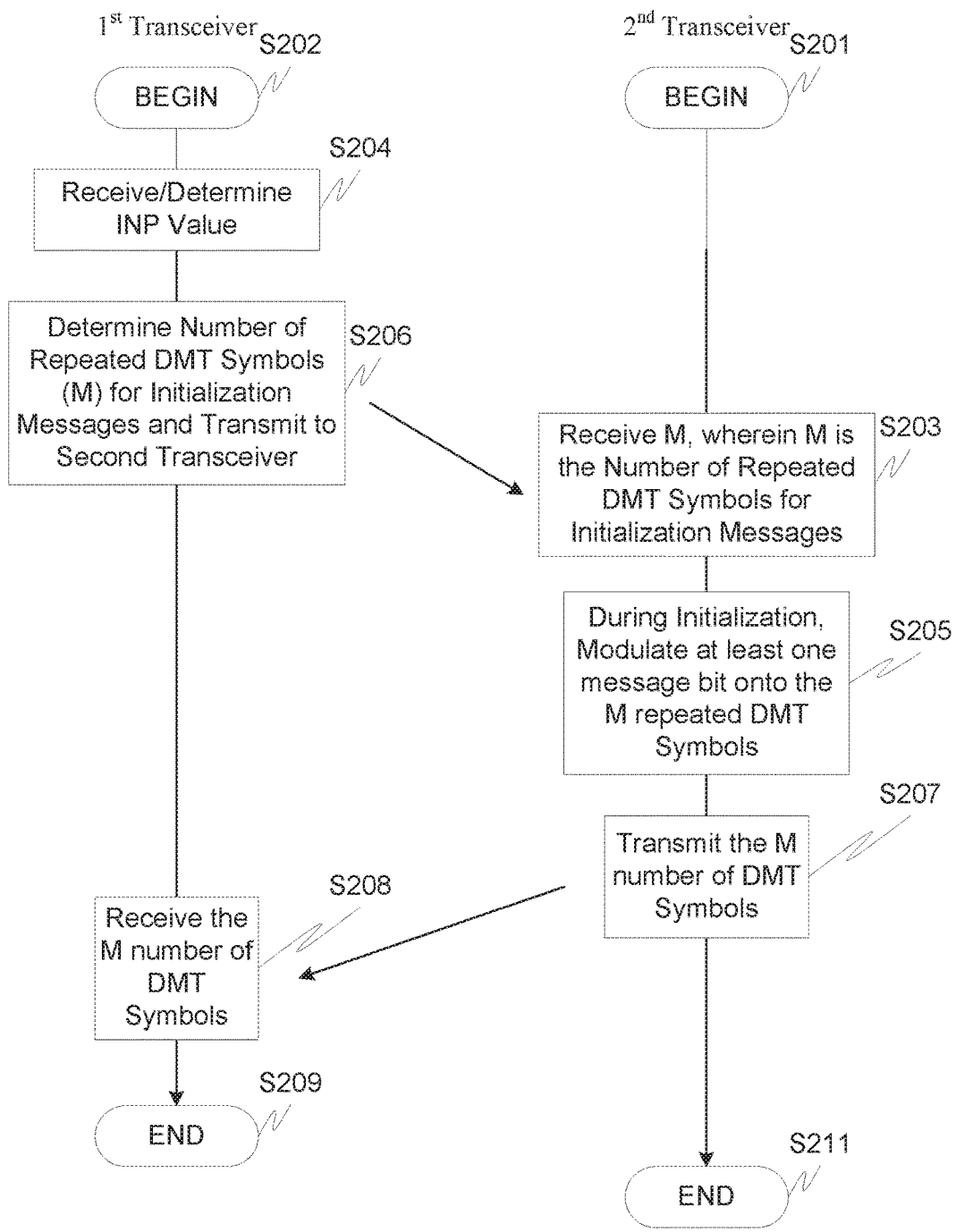
FIG. 4 is a flowchart outlining a third exemplary embodiment for initializing a communication system according to this invention.

FIG. 4 illustrates another exemplary initialization methodology and communication between transceivers. More specifically, for the first transceiver, control begins in step S202 and continues to step S204. In step S204, an INP value is determined or, for example, received from a management system or another transceiver. Next, in step S206, the number of repeated DMT symbols (M) for initialization messages is determined and transmitted to a second transceiver. Then, in step S208, the M number of DMT symbols are received. Control then continues to step S209 where the control sequence ends.

For the second transceiver, control begins in step S201 and continues to step S203. In step S203, M is received. Next, in step S205, and during initialization, at least one message bit is modulated onto the M repeated DMT symbols Then, in step S207, the M number of DMT symbols are transmitted. Control then continues to step S211 where the control sequence ends.

As with the previously discussed embodiments, and while not specifically illustrated in the flowchart, additional error detection capability can also be added to initialization message(s) to enable the location of bit errors. For example, each DMT symbol could also include at least one CRC bit, which can be used to detect if the DMT symbol is received correctly or in error. However, this embodiment is not limited thereto and any error detection technique in any configuration will work with the invention.

Figure 5:
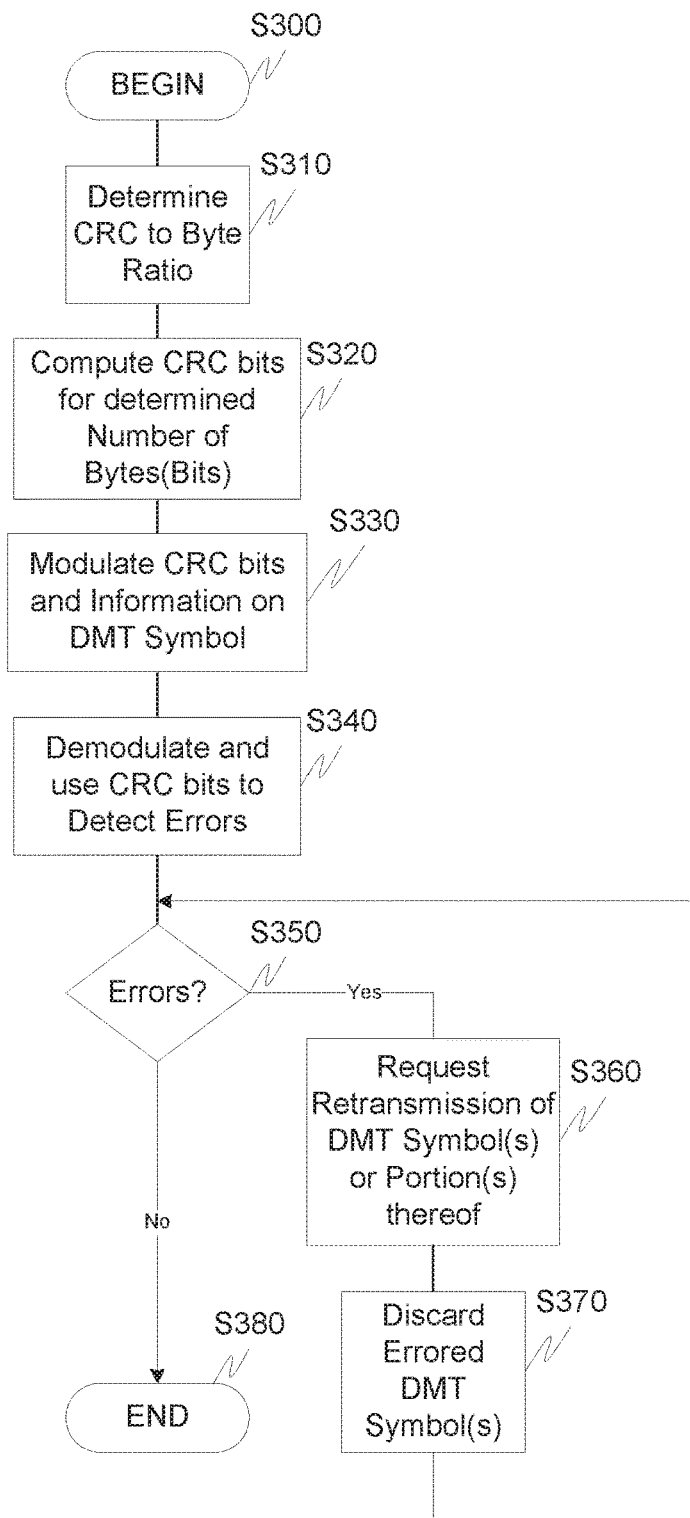
FIG. 5 is a flowchart outlining a fourth exemplary embodiment for initializing a communication system according to this invention.

FIG. 5 illustrates another exemplary initialization methodology according to this invention. In particular, control begins in step S300 and continues to step S310. In step S310, the CRC to byte ratio is determined. Next, in step S320, one or more CRC bits are determined for a number of bytes or bits. Then, in step S330, the one or more CRC bits are modulated in addition to additional information on a DMT symbol. Control then continues to step S340.

In step S340, the DMT symbol is demodulated and the one or more CRC bits are used to detect errors. Next, in step S350, a determination is made whether the CRC bits have revealed errors. If errors are present, control continues to step S360. Otherwise, control jumps to step S380 where the control sequence ends.

In step S360, retransmission of one or more DMT symbols or portions thereof are requested. Then, in step S370, the errored DMT symbols are discarded. Control then continues back to step S350.

Figure 6:
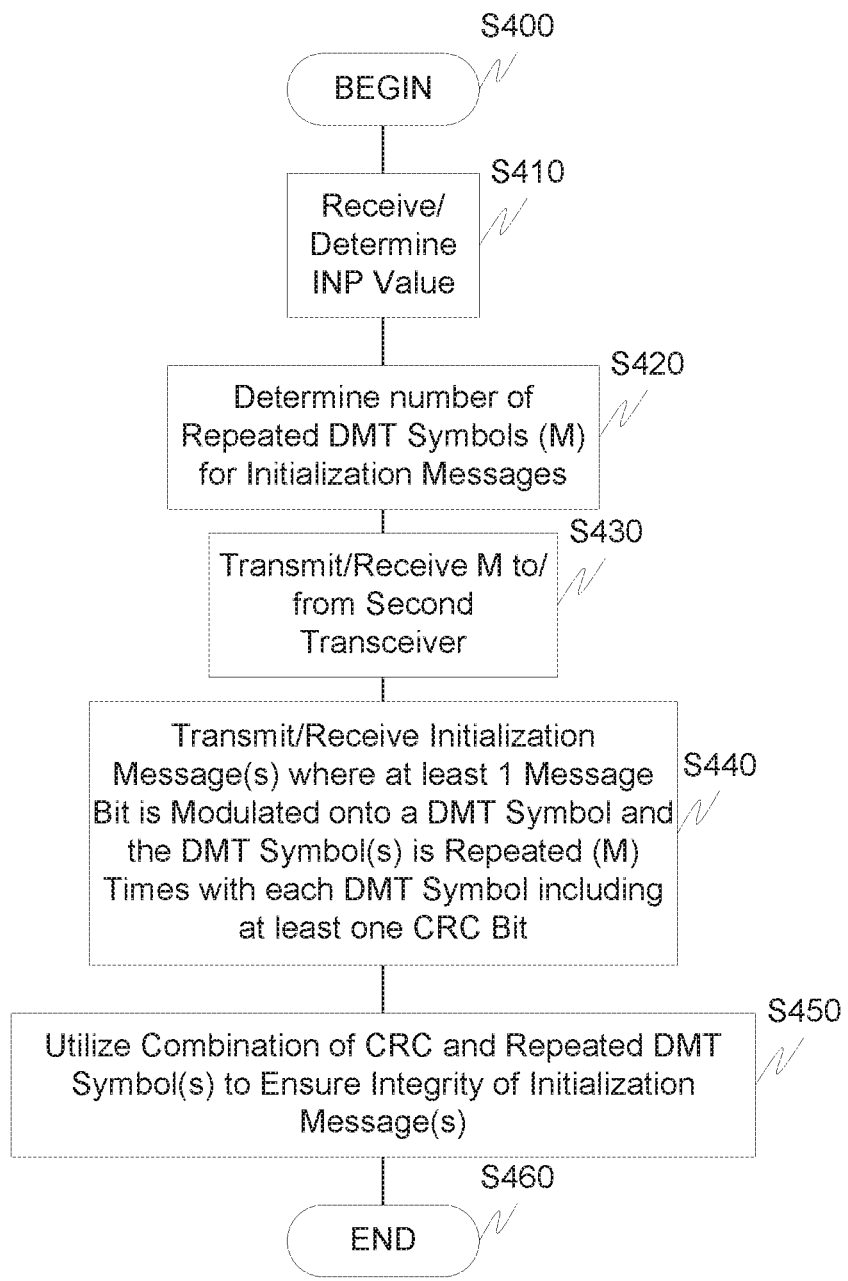
FIG. 6 is a flowchart outlining a fifth exemplary embodiment for initializing a communication system according to this invention.

FIG. 6 illustrates another exemplary embodiment for communication initialization according to this invention. In particular, control begins in step S400 and continues to step S410. In step S410, an INP value is determined or, for example, received from a management system or another transceiver. Next, in step S420, the number of repeated DMT symbols M is determined for initialization messages. Then, in step S430, the value for the number of repeated DMT symbols is transmitted to, or received from, as appropriate, a second transceiver. Control then continues to step S440.

In step S440, one or more initialization messages are transmitted or received, as appropriate, wherein at least one message bit is modulated onto a DMT symbol and the DMT symbol(s) is repeated M times with each DMT symbol including at least one CRC bit. Next, in step S450, the combination of CRC bit(s) and repeated DMT symbols are utilized to insure integrity of the initialization message(s). Control then continues to step S460 where the control sequence ends.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments.

The above-described system can be implemented on wired and/or wireless telecommunications devices, such as a modem, a multicarrier modem, a DSL modem, an ADSL modem, an xDSL modem, a VDSL modem, a linecard, test equipment, a multicarrier transceiver, a wired and/or wireless wide/local area network system, a satellite communication system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL or the like.

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has been provided, in accordance with the present invention, systems and methods for initializing transceivers. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A multicarrier transceiver comprising:
a receiver capable of determining a repetition rate for DMT (Discrete Multitone Modulation) symbols;
a transmitter capable of transmitting a first message during initialization, wherein the message indicates the repetition rate;
the receiver further capable of receiving a second message during initialization, wherein DMT symbols in the second message are repeated in accordance with the repetition rate indicated in the first message,
wherein the message comprises a plurality of CRC (Cyclic Redundancy Check) bits, and
wherein at least one DMT symbol in the second message comprises one CRC byte and no information bits.

2. The transceiver of claim 1, wherein the receiver is capable of determining the repetition rate based on an INP (Impulse Noise Protection) value.

3. The transceiver of claim 1, wherein the receiver is capable of determining the repetition rate based on impulse noise measurements.

4. The transceiver of claim 1, wherein the receiver is capable of determining the repetition rate based on crosstalk measurements.

5. A multicarrier transceiver comprising:
a receiver capable of determining a repetition rate for DMT (Discrete Multitone Modulation) symbols;
a transmitter capable of transmitting a first message during initialization, wherein the message indicates the repetition rate;
the transmitter further capable of transmitting a second message during initialization, wherein DMT symbols in the second message are repeated in accordance with the repetition rate indicated in the first message, and
wherein the message comprises a plurality of CRC (Cyclic Redundancy Check) bits and wherein at least one DMT symbol in the second message comprises one CRC byte and no information bits.

6. The transceiver of claim 5, wherein the receiver is capable of determining the repetition rate based on an INP (Impulse Noise Protection) value.

7. The transceiver of claim 5, wherein the receiver is capable of determining the repetition rate based on impulse noise measurements.

8. The transceiver of claim 5, wherein the receiver is capable of determining the repetition rate based on crosstalk measurements.

9. A non-transitory computer-readable information storage media, having stored thereon instructions, that when executed by one or more processors in a transceiver, cause to be performed a method comprising:
determining, by a receiver, a repetition rate for DMT (Discrete Multitone Modulation) symbols;

transmitting, by a transmitter, a first message during initialization, wherein the message indicates the repetition rate;

receiving, by the receiver, a second message during initialization, wherein DMT symbols in the second message are repeated in accordance with the repetition rate indicated in the first message, and wherein the message comprises a plurality of CRC (Cyclic Redundancy Check) bits and wherein at least one DMT symbol in the second message comprises one CRC byte and no information bits.

10. The non-transitory computer-readable information storage media of claim 9, wherein the determining of the repetition rate is based on an INP (Impulse Noise Protection) value.

11. The non-transitory computer-readable information storage media of claim 9, wherein the determining of the repetition rate is based on impulse noise measurements.

12. A non-transitory computer-readable information storage media, having stored thereon instructions, that when executed by one or more processors in a transceiver, cause to be performed a method comprising:

determining, by a receiver, a repetition rate for DMT (Discrete Multitone Modulation) symbols;

transmitting, by a transmitter, a first message during initialization, wherein the message indicates the repetition rate;

transmitting, by the transmitter, a second message during initialization, wherein DMT symbols in the second message are repeated in accordance with the repetition rate indicated in the first message, wherein the message comprises a plurality of CRC (Cyclic Redundancy Check) bits and wherein at least one DMT symbol in the second message comprises one CRC byte and no information bits.

13. The non-transitory computer-readable information storage media of claim 12, wherein the determining of the repetition rate is based on an INP (Impulse Noise Protection) value.

14. The non-transitory computer-readable information storage media of claim 12, wherein the determining of the repetition rate is based on impulse noise measurements.

15. A multicarrier transceiver comprising:

a receiver capable of determining, during initialization, a repetition rate for DMT (Discrete Multitone Modulation) symbols;

a transmitter capable of transmitting a first message during initialization, wherein the message indicates the repetition rate;

the receiver further capable of receiving a second message during initialization, wherein DMT symbols in the second message are repeated in accordance with the repetition rate indicated in the first message, wherein the message comprises a plurality of CRC (Cyclic Redundancy Check) bits, wherein at least one DMT symbol in the second message comprises one CRC byte and no information bits.

16. The transceiver of claim 15, wherein the receiver is capable of determining the repetition rate based on an INP (Impulse Noise Protection) value.

17. The transceiver of claim 15, wherein the receiver is capable of determining the repetition rate based on impulse noise measurements.

18. The transceiver of claim 15, wherein the receiver is capable of determining the repetition rate based on crosstalk measurements.

19. A multicarrier transceiver comprising:

a receiver capable of determining, during initialization, a repetition rate for DMT (Discrete Multitone Modulation) symbols;

a transmitter capable of transmitting a first message during initialization, wherein the message indicates the repetition rate;

the transmitter further capable of transmitting a second message during initialization, wherein DMT symbols in the second message are repeated in accordance with the repetition rate indicated in the first message, and wherein the message comprises a plurality of CRC (Cyclic Redundancy Check) bits and wherein at least one DMT symbol in the second message comprises one CRC byte and no information bits.

20. The transceiver of claim 19, wherein the receiver is capable of determining the repetition rate based on an INP (Impulse Noise Protection) value.

21. The transceiver of claim 19, wherein the receiver is capable of determining the repetition rate based on impulse noise measurements.

22. The transceiver of claim 19, wherein the receiver is capable of determining the repetition rate based on crosstalk measurements.

* * * * *